United States Patent [19]

Wegscheider

[11] 3,807,716

[45] Apr. 30, 1974

[54] PROCESS FOR THE CONTINUOUS PRODUCTION OF STEEL BY SPRAY-REFINING AND PLANT FOR CARRYING OUT THE PROCESS

[75] Inventor: Fred Wegscheider, Linz, Austria

[73] Assignee: Vereinigte Osterreichiscke Eisen- und Stahlwerke Aktiengesellschaft, Linz, Austria

[22] Filed: Mar. 21, 1973

[21] Appl. No.: 343,270

Related U.S. Application Data

[62] Division of Ser. No. 100,710, Dec. 22, 1970, abandoned.

[30] Foreign Application Priority Data

Dec. 24, 1969  Austria............................ 12040/69

[52] U.S. Cl....................................... 266/13, 75/13
[51] Int. Cl.............................................. C21c 5/56
[58] Field of Search.............. 75/43, 60, 13; 164/64, 164/281; 266/13

[56] References Cited
UNITED STATES PATENTS

| | | | |
|---|---|---|---|
| 1,035,280 | 8/1912 | Walker | 266/13 |
| 3,271,020 | 9/1966 | Heemyer | 266/13 |
| 336,439 | 2/1886 | Samuel | 266/13 |

*Primary Examiner*—Gerald A. Dost
*Attorney, Agent, or Firm*—Brumbaugh, Graves, Donohue & Raymond

[57] ABSTRACT

The invention relates to a process and plant for the continuous production of steel by spray refining of liquid pig iron by means of a gaseous refining agent under the addition of slag formers, in which the steel is separated from the slag and continuously cast to bars. The improvement resides in that after the spray refining stage the steel and slag are jointly and continuously guided into a large-volume collecting vessel where they are allowed to undergo finishing reactions and from where the steel, part of which is always retained together with slag in the collecting vessel, is taken in portions to be further treated in an electric furnace so as to correct its analysis and temperature. By this arrangement the great advantage is gained that both the spray refining plant and the continuous casting plant may work absolutely continuously and independent of each other.

5 Claims, 2 Drawing Figures

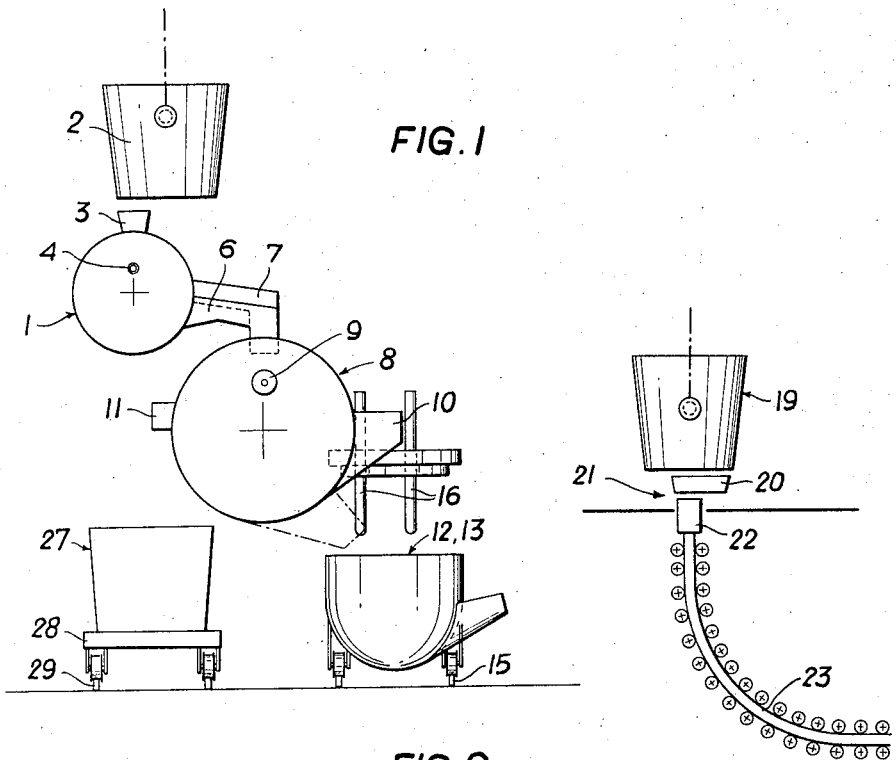
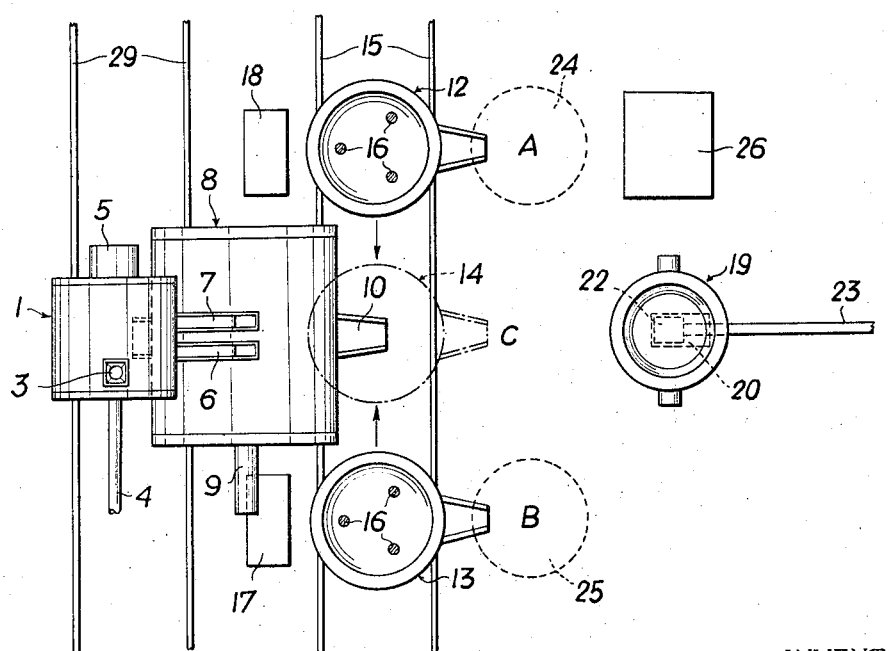

PROCESS FOR THE CONTINUOUS PRODUCTION OF STEEL BY SPRAY-REFINING AND PLANT FOR CARRYING OUT THE PROCESS

This is a division, of U.S. Pat. application Ser. No. 100,710 filed Dec. 22, 1970 and now abandoned.

The invention relates to a process for the continuous production of steel by spray refining of liquid pig iron by means of a gaseous refining agent under the addition of slag formers, such as lime, fluorspar, bauxite and the like, and, if desired, under the addition of coolants, such as ore, limestone, scrap and the like, in which the steel is separated from the refining slag, whereupon, if desired after vacuum treatment, it is continuously cast to bars, and to a plant for carrying out the process.

When spray refining processes are used for continuously converting pig iron to steel various difficulties occur which do not allow a fully continuous operation — i.e. also continuous casting of the steel. Experience has shown that it is difficult to separate the slag which is created during spray refining from the metal. The metal droplets which hit upon the slag after spraying of the pig iron stream cannot be completely separated from it. As a result, the slag has an undesired high content of iron shots so that the yield of liquid steel is very low. In the spray refining process the refining slag has also a considerable content of metal oxides, in particular iron oxides. The iron oxide content of the slag physically and chemically holds a certain equilibrium to the carbon content of the steel; however, the equilibrium can only be reached or almost reached when the steel and the slag are given sufficient time for reacting. In the known spray refining processes in which either a vertical or a horizontal spraying cone was formed in the refining vessel this condition was not fulfilled and it was not possible to establish an equilibrium between slag and steel, especially as in the known plants also the tap-holes for steel and slag are in the area of impingement of the spraying cone. Under these operating conditions it is not possible to continuously produce a steel capable of being cast and having an invariable composition and a uniform tapping temperature.

The problem of continuously casting steel to bars has, in itself, already been solved; thus it is e.g. possible to provide for a continuous supply of liquid steel to the mould of a continuous casting plant by the flying exchange of casting ladle and distributing vessel. However, any attempt to produce continuously cast bars in succession to a continuously working spray refining plant has failed so far since the above mentioned difficulties prevented a combination of the two working methods.

The invention is aimed at avoiding these difficulties by creating a process, and a plant which optimally exploits the advantages of spray refining and continuous casting and connects them in an economical overall working course.

This aim of the invention is achieved in a process of the kind defined in the introductory part, in that after spray refining, the steel and slag are jointly and continuously guided from the spray refining stage into a large-volume collecting vessel where they are allowed to complete reactions and from where, a part of the steel and slag always being left in said collecting vessel, the steel is taken in portions to be further treated in an electric furnace, preferably in an electric resistance-arc furnace, so as to correct its analysis and temperature. Reducing agents, such as aluminum, silicon, carbon and the like, and, if desired, fluxing agents, may be added and heat may be supplied to the refining slag during the finishing reaction stage so as to reduce the amount of metal oxides, in particular iron oxides, contained in the slag.

The invention further comprises a plant for carrying out the process comprising a spray refining plant for continuously converting liquid pig iron into steel, if desired a steel degassing plant, and a continuous casting plant, which is characterized in that a tiltable, large-volume, if desired heatable, collecting vessel for continuously receiving steel and refining slag, and an electric furnace plant comprising at least two furnaces with horizontally displaceable hearth vessels are coordinated to the refining vessel, the hearth vessels being adapted to be alternatively moved into the working area of the collecting vessel for receiving portions of the steel.

According to a preferred embodiment of the invention two resistance-arc furnaces having hearth vessels which are movable on a common rail track in opposite directions into the operation area of the collecting vessel are provided symmetrically of the collecting vessel.

In order that details of the invention and the coaction of the individual plant parts may be more fully understood an embodiment thereof shall now be explained with reference to the accompanying drawing.

FIG. 1 is a simplified representation of a lateral view of the total plant and

FIG. 2 shows the plan view of this plant.

Liquid pig iron runs from a ladle 2 via an input funnel 3 in vertical direction into the refining vessel 1 of the spray refining plant. The pig iron stream is atomized and thus refined by an oxidizing gas jet which is supplied through the blowing nozzle 4 in horizontal direction to form a horizontal spraying cone. To the spraying cone additions are added such as slag formers and coolants, for example lime, limestone, fluorspar, bauxite, ore and the like, so that a basic slag is formed and the steel is adequately dephosphorised and desulphurised. Numeral 5 denotes the gas offtake (FIG. 2). The refined steel runs continuously through a tap via the groove 6 into a large-volume collecting vessel 8. The steel tap is arranged in a manner that in the refining vessel 1 a sump of liquid steel will always be present. Through a slag tap which is arranged somewhat higher, the slag runs continuously via the groove 7 into the collecting vessel 8. If desired, steel and refining slag may also flow through a common tap over a single groove into the collecting vessel. The collecting vessel 8 is tiltable around its longitudinal axis. By means of a burner 9 the slag may be supplied with heat. Numerals 10 and 11 denote openings for permitting the steel or slag, respectively, to run off. Below the collecting vessel 8 a rail track 15 is provided on which hearth vessels 12, 13 belonging to resistance-arc furnaces are movable in the direction of the arrows shown in FIG. 2 from their starting positions A and B, respectively, into position C. Numeral 14 denotes a hearth vessel 12 or 13, respectively, which is drawn in a dash-dot line (FIG. 2) when it stands ready for receiving a melt from the collecting vessel 8. The electric furnace covers belonging to the hearth vessels 12, 13, the electrodes 16 and the transformer stations 17, 18 are in the starting positions A, B. The hearth vessels 12 and 13 are alternatively driven out to receive the melt which then is further treated so as to correct the analysis and temperature, whereupon the finished, castable steel is tapped into stopper ladles and transported to a continuous casting plant 21. Numeral 19 denotes a ladle which is in working position, arranged above the tundish 20. The steel flows into the tundish 20 and from there into the water cooled mould 22 from where the bar 23 is drawn. Further casting ladles illustrated in dash lines and denoted with 24 and 25 are positioned in the area of the resistance arc furnaces. When necessary some or all melts may be vacuum treated in customary manner before the steel is cast in a steel degassing plant 26 which may be present. The resistance arc furnaces may also co-act with a tap degassing plant of known construction so that degassing takes place during tapping into the casting ladle and an individual station is superfluous.

The holding capacity of the collecting vessel 8 is such that several electric furnace melts may be received and an amount of slag which is proportional to the amount of steel may be stored. Steel and slag leave the collecting vessel 8 only after sufficiently long staying time in order to guarantee an adequate reaction of the refining slag, i.e. to assure that the iron shots separate from the slag and the iron oxide content is reduced to a value which almost corresponds to the equilibrium conditions. By adding reducing agents, such as silicium, aluminum, carbon and the like, into the slag groove 7 or into the collecting vessel 8, the reduction of the metal oxides may be further improved. As has been pointed out the slag may be kept fluid in the collecting vessel 8 by supplying heat. If desired, also fluorspar or bauxite may be added to lower the melting point. The collecting vessel 8 is a reaction vessel which serves above all the reaction between slag and steel. The slag runs either continuously through the tap 11 or discontinuously upon tilting of the collecting vessel 8 into a slag ladle 27. Along the rail track 29 the slag ladles are driven to the dump by means of transport vehicles 28.

Instead of resistance arc furnaces it is also possible to use medium frequency induction furnaces.

In a plant employing the process according to the invention it is possible to produce continuously from pig iron having a composition of e.g. 4.20 % C, 0.35 % Si, 1.20 % Mn, 0.080 % P and 0.060 % S steels having a composition of 0.02 to 0.20 % C, 0 % Si, 0.08 to 0.25 % Mn, 0.010 to 0.020 % P and 0.015 to 0.025 % S. Owing to the slag reduction in the collecting vessel the total iron content of the slag (Fe in shots and Fe in the form of oxides) may be kept below 25 percent in the production of steels with 0.02 to 0.03 % C; this total iron content of the slag is lower than that obtained in the steel production according to the oxygen converter ("LD") process. The Fe output amounts to from 93 to 94 percent.

When resistance arc furnaces are used, their transformers may be essentially smaller than this is the case with mere melting furnaces, because in the plant according to the invention only a temperature correction, but no major heating of the liquid steel is necessary.

The essential advantage of the plant according to the invention resides in that both the spray refining plant and the continuous casting plant may work absolutely continuously and independent of each other. Taking out of refined steel from the collecting vessel by two movable hearth vessels and subsequent further treatment of the steel in the hearth vessels may easily be tuned to the rhythm of the continuous casting plant, provided that the holding capacity of the collecting vessel is sufficient. On the other hand the volume of the spray refining vessel may be kept very small because part of the reaction between slag and steel will take place in the collecting vessel.

What I claim is:

1. A plant for the continuous production of steel by spray refining of liquid pig iron, comprising a spray refining plant with a refining vessel for continuously converting liquid pig iron into steel and a continuous casting plant, a tiltable, large-volume collecting vessel for continuously receiving steel and slag, and an electric furnace plant including at least two furnaces with horizontally movable hearth vessels being coordinated to the refining vessel, said hearth vessels being adapted to be alternatively moved into the operation area of the collecting vessel to receive portions of the steel.

2. The plant set forth in claim 1, wherein a degassing plant is arranged in succession to said spray refining plant.

3. The plant set forth in claim 1, wherein the collecting vessel is heatable.

4. The plant set forth in claim 1, wherein two resistance-arc furnaces with hearth vessels which are movable on a common rail track in opposite directions into the operation area of the collecting vessel are provided symmetrically of the collecting vessel.

5. A plant for the continuous production of steel comprising a spray refining station including a refining vessel having inlet means for continuously supplying a stream of liquid pig iron, spraying means directing pressurized refining gas against said pig iron stream, supply means for admixtures including slag-forming agents, and outlet means allowing continuous joint outflow of steel and slag and situated at a level to constantly retain a storage sump in said refining vessel; a large-volume collecting vessel connected to said outlet means and having, in turn, separate outlets for steel and slag; at least two alternately operating hearth vessels each transferable between a position in which said hearth vessel receives steel via said collecting vessel steel outlet and a position in which said hearth vessel is operated as an electric furnace for adjustment of analysis and temperature of the steel therein; and a continuous casting station connected by transport communication means with said spray refining station for constant supply of castable steel.

* * * * *

PO-1050
(5/69)

UNITED STATES PATENT OFFICE
CERTIFICATE OF CORRECTION

Patent No. 3,807,716          Dated Apr. 30, 1974

Inventor(s) Fred Wegscheider

It is certified that error appears in the above-identified patent and that said Letters Patent are hereby corrected as shown below:

First page, Item [73], "Vereinigte Osterreichiscke Eisen- und Stahlwerke Aktiengesellschaft" should be --Vereinigte Österreichische Eisen- und Stahlwerke - Alpine Montan Aktiengesellschaft--.

Signed and sealed this 22nd day of October 1974.

(SEAL)
Attest:

McCOY M. GIBSON JR.          C. MARSHALL DANN
Attesting Officer          Commissioner of Patents